D. K. ALLISON.
PAN SKIPPING DEVICE FOR CRACKER CUTTING MACHINES.
APPLICATION FILED MAY 19, 1919.
1,323,668.
Patented Dec. 2, 1919.
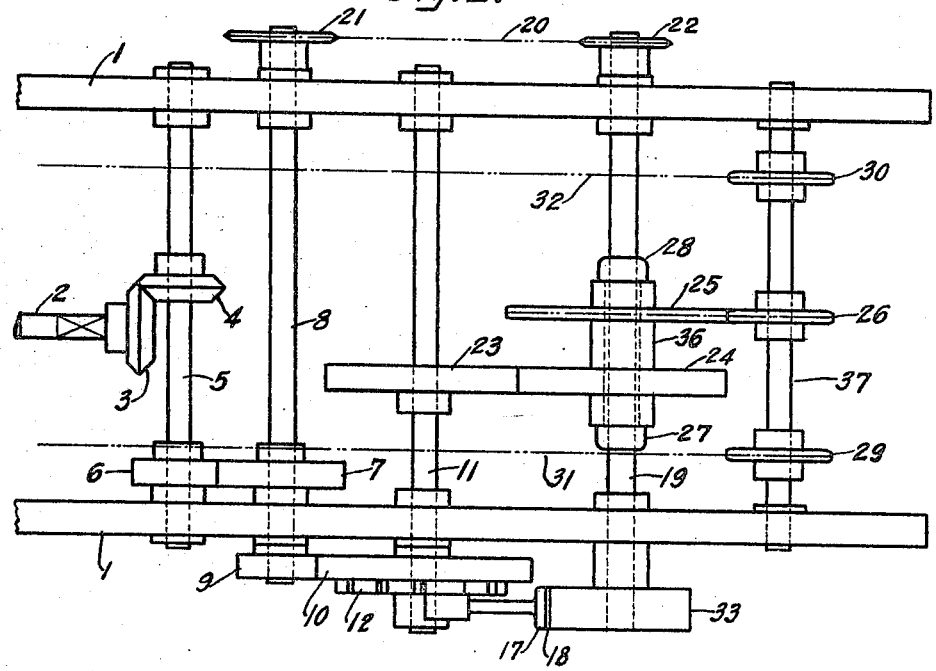
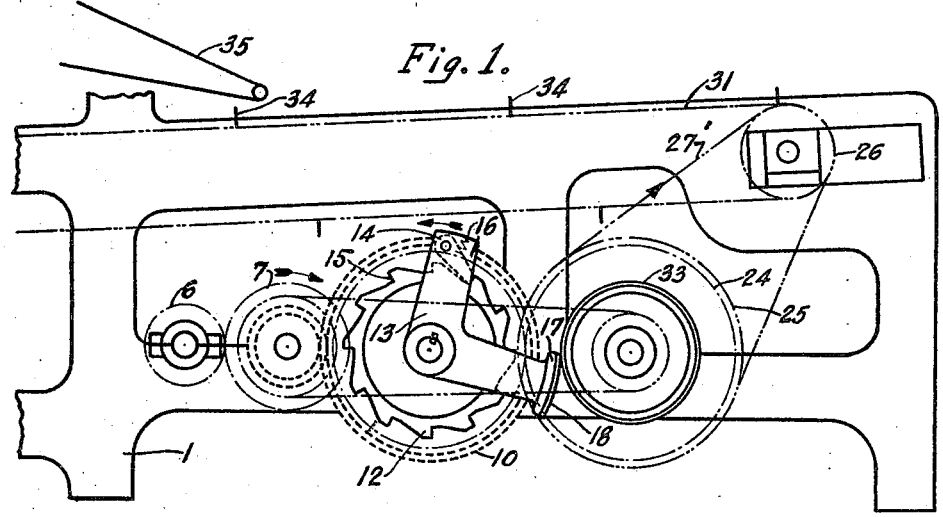
Inventor
Daniel K. Allison

UNITED STATES PATENT OFFICE.

DANIEL K. ALLISON, OF CINCINNATI, OHIO.

PAN-SKIPPING DEVICE FOR CRACKER-CUTTING MACHINES.

1,323,668.      Specification of Letters Patent.      Patented Dec. 2, 1919.

Application filed May 19, 1919. Serial No. 298,274.

*To all whom it may concern:*

Be it known that I, DANIEL K. ALLISON, a citizen of the United States, residing in Cincinnati, county of Hamilton, and State of Ohio, have invented a certain new and useful Improvement in Pan-Skipping Devices for Cracker-Cutting Machines, of which the following is a specification.

My invention relates to machines for cutting crackers or biscuits from a sheet of dough and delivering the cut biscuit forms onto pans preparatory to baking and as the pans are usually carried upon conveyer chains or belts in succession through the machine it is the object of my invention to give to the panning chains a periodically accelerated movement as each pan passes a predetermined point to prevent the biscuit forms from being deposited on the edges of the pans or between the pans. I accomplish this object by the mechanism hereinafter described and illustrated in the drawings in which—

Figure 1 is a side elevation of my invention and Fig. 2 is a plan view of the same parts.

In the drawings 1—1 represent parts of the frames of a cracker cutting machine. 2 is a power transmission shaft extending from the main drive of the machine. The miter-gear 3 is fixed to shaft 2 and drives miter-gear 4 which is fast on shaft 5. Spur gear 6 is fast on shaft 5 and drives gear 7 which is fast on shaft 8. Spur gear 9 also fast on shaft 8 meshes into and drives gear 10 which is loosely mounted on shaft 11. Fastened to gear 10 or preferably integral therewith is the ratchet annulus 12. Adjacent to gear 10 and the ratchet annulus 12 is the bell crank arm 13 which is fixed on shaft 11, and carries the pawl 14 which is arranged to engage the teeth 15 of the ratchet annulus. The spring 16 keeps the pawl 14 in engagement with the teeth 15 of the ratchet annulus. The bell crank arm 13 is provided on a right angle extension with a widened surface 17 which is coated with a frictional covering 18 preferably of leather. The shaft 19 is driven from shaft 8 through the chain 20 and sprocket wheels 21 and 22 both fast on their respective shafts. Gear 23 is fast on shaft 11 and drives gear 24 which is integral with sprocket wheel 25 and sleeve 36. Gear 24, sprocket 25 and sleeve 36 are all loose on shaft 19 and are held in position laterally by the set collars 27 and 28. Sprocket 25 drives sprocket 26 by the chain 27'. Sprocket 26 is fast on shaft 37 and sprockets 29 and 30 are also fast on said shaft 37 and carry the conveyer chains 31 and 32 upon which the pans are conveyed through the machine. Fast on shaft 19 is a pulley 33. Shaft 19 is geared so that the periphery of said pulley 33 has a velocity greater than that of the friction surface 18 of the bell crank arm 13. All the shafts heretofore mentioned are rotatably mounted in suitable bearings secured to the frames of the machine.

In the operation of my invention power is transmitted from the main drive of the machine through the shafts 2, 5 and 8 and the gears 3 and 4, and 6 and 7. Pans are placed in succession on the conveyer chains 31 and 32 between the lugs 34—34 and as they are carried along cracker or biscuit forms are deposited thereon from the traveling apron 35. The bell crank arm 13 serves to drive the conveyer chains 31 and 32 through the shaft 11, gears 23 and 24, sprocket wheels 25 and 26 and chain 27' and the said bell crank arm 13 is arranged to make one complete rotation to carry the conveyer chains the distance equal to the length of one pan. The bell crank arm 13 is driven normally through the major part of each rotation by the ratchet annulus 12 by means of the pawl 14 and when the bell crank arm 13, in its circuit, reaches the position shown in the drawing the pulley 33 engages the friction surface 18 and, by reason of its high speed, advances the bell crank arm the distance of one ratchet tooth. This advancing movement of the bell crank arm 13 occurs but once for each rotation of the arm and serves to transmit to the conveyer chains 31 and 32 an accelerated or pan skip movement which serves to prevent the crackers or biscuits from falling on the edges of the pans or between the pans and this insures their proper deposit on consecutive pans.

Having described my invention, what I claim as new and desire to secure by Letters Patent is:—

1. The combination of a driving gear, a driven gear loosely mounted upon a shaft and carrying a ratchet annulus, a bell crank arm secured to said shaft carrying a pawl arranged to engage the said ratchet annulus, a pulley fixed to a second shaft driven independently of said gear drive and at a higher velocity than that of the said bell crank arm to periodically advance the latter.

2. The combination, an arm fast on a shaft, a power driven ratchet annulus mounted loosely on said shaft adjacent to said arm, a pawl connection between the ratchet annulus and the arm and friction means for periodically advancing said arm.

3. The combination of an arm fixed to a shaft, a power driven ratchet annulus mounted loosely on said shaft adjacent to said arm, ratchet means whereby the ratchet annulus drives the said arm during the major part of each complete rotation thereof and annular friction means to drive said arm during the remainder of each rotation.

DANIEL K. ALLISON.

Witnesses:
 WILLIAM HUST,
 WALTER A. RIDD.